(12) United States Patent
Schäfer

(10) Patent No.: US 8,050,258 B2
(45) Date of Patent: Nov. 1, 2011

(54) METHOD AND SYSTEM FOR HANDLING DATA BASED ON THE ACKNOWLEDGEMENT AND EXTRACTION OF DATA PACKETS

(75) Inventor: Philipp Schäfer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 818 days.

(21) Appl. No.: 10/570,908

(22) PCT Filed: Sep. 3, 2004

(86) PCT No.: PCT/EP2004/009864
§ 371 (c)(1),
(2), (4) Date: Mar. 3, 2006

(87) PCT Pub. No.: WO2005/024637
PCT Pub. Date: Mar. 17, 2005

(65) Prior Publication Data
US 2007/0041394 A1  Feb. 22, 2007

(30) Foreign Application Priority Data
Sep. 4, 2003  (DE) .................................. 103-40-865

(51) Int. Cl.
*H04L 12/28*  (2006.01)

(52) U.S. Cl. ....................................................... 370/389

(58) Field of Classification Search .................... 370/389
See application file for complete search history.

(56) References Cited

U.S. PATENT DOCUMENTS

| | | | | |
|---|---|---|---|---|
| 5,768,509 A | * | 6/1998 | Gunluk | 709/203 |
| 5,878,056 A | * | 3/1999 | Black et al. | 714/748 |
| 6,609,165 B1 | * | 8/2003 | Frazier | 710/36 |
| 2001/0043616 A1 | * | 11/2001 | Hild et al. | 370/477 |
| 2002/0051425 A1 | * | 5/2002 | Larsson | 370/252 |
| 2002/0141353 A1 | | 10/2002 | Ludwig et al. | |
| 2004/0125926 A1 | * | 7/2004 | Svoboda | 379/100.08 |

FOREIGN PATENT DOCUMENTS

| | | | |
|---|---|---|---|
| DE | 101 04 713 A1 | | 8/2002 |
| WO | WO95/25306 | * | 9/1995 |
| WO | WO 95/25306 A2 | | 9/1995 |
| WO | WO 9525306 A2 | * | 9/1995 |
| WO | WO 99/20062 A1 | | 4/1999 |

* cited by examiner

*Primary Examiner* — Ayaz Sheikh
*Assistant Examiner* — Hai-Chang Hsiung

(57) ABSTRACT

The invention relates to a method for handling, namely forwarding and extracting, data, especially messages, in a system comprising at least one data source and a plurality of data receivers. The invention also relates to a corresponding system comprising at least one data source and at least one data receiver. At least one set of data, especially a message, is forwarded to a plurality of data receivers from a data source. According to the invention, when a set of data forwarded from the data source is acknowledged by one of the data receivers, said acknowledged data is preferably automatically extracted from the data source for the rest of the data receivers.

14 Claims, 1 Drawing Sheet

METHOD AND SYSTEM FOR HANDLING DATA BASED ON THE ACKNOWLEDGEMENT AND EXTRACTION OF DATA PACKETS

This application claims priority to the German application No. 10340865.7, filed Sep. 4, 2003 and to the International Application No. PCT/EP2004/009864, filed Sep. 3, 2004 which are incorporated by reference herein in their entirety.

FIELD OF INVENTION

The invention relates to a method for handling, namely forwarding and withdrawing, messages in a system comprising at least one data source and a number of data receivers. The present invention also relates to a corresponding device and an automation system.

BACKGROUND OF INVENTION

There are a number of applications, in which data is transmitted from a data source to a number of data receivers, but with a transmitted set of data only having to be processed by one data receiver. One example is an automation system, in which a warning message or error report is transmitted in the automation system from an automation device serving as the data source to a number of automation devices serving as data receivers, whereby, when one of the automation devices serving as data receivers has processed the warning message, the warning message or error report becomes invalid for the other automation devices serving as data receivers.

SUMMARY OF INVENTION

According to the prior art the problem arises that a warning message for example is retained on the data receivers to which it was transmitted, even when the warning message has already been processed by one of the data receivers. This can lead to problems with obsolete or already processed data. If for example a warning message specifically has been processed by a data receiver, repeat processing by another data receiver is superfluous. There is therefore a need to forward messages from a data source specifically to a number of data receivers and on the other hand also to allow the withdrawal of messages in a specific manner.

With regard to forwarding and withdrawing data, it is known from the prior art that every set of data can be transmitted to the data receivers together with a time-out. A time-out defines a time period, after which data is withdrawn from a data receiver irrespective of its processing. The use of such time-outs has the disadvantage that data can also be withdrawn from all data receivers before any of the data receivers has processed the said data. There is still the problem of obsolete data as before, as duplicate processing of a set of data within the time-out cannot be excluded even when using a time-out. This is generally disadvantageous.

A method and a device for handling messages in a network with a storage device and a number of input/output devices are known from U.S. Pat. No. 6,609,165 B1.

With this in mind, a problem addressed by the present invention is to create a novel method for handling messages as well as a corresponding device and an automation system.

This problem is resolved by the claims. According to the invention, if a message forwarded from the data source is acknowledged by one of the data receivers, this acknowledged message is withdrawn automatically for the other data receivers. Acknowledgement of the message does not simply mean confirmation of receipt of a message forwarded from the data source, rather it refers to the active confirmation from a data receiver regarding the processing of the message forwarded from the data source.

It is therefore proposed according to the present invention that a forwarded message be withdrawn automatically from the other data receivers, to which the message was forwarded, in response to the processing of the message by one data receiver. This is preferably dealt with by the data source. It ensures that a message is withdrawn from the data receivers immediately after its processing has been acknowledged, thereby avoiding problems with obsolete data in a reliable and specific manner.

According to an advantageous development of the invention the message is forwarded to a number of data receivers, each data receiver confirming receipt of the message in that each data receiver transmits a receipt confirmation to the data source. The data receiver, which after receiving the message also acknowledges the processing of the same, transmits a processing confirmation to the data source, whereupon this message is automatically withdrawn by the data source for the other data receivers based on the processing confirmation.

Preferred developments of the invention will emerge from the dependent claims and the description which follows.

BRIEF DESCRIPTION OF THE DRAWINGS

A preferred exemplary embodiment of the invention—although it is not restricted to this—is described in more detail below with reference to the drawing, in which.

DETAILED DESCRIPTION OF INVENTION

Figure 1:
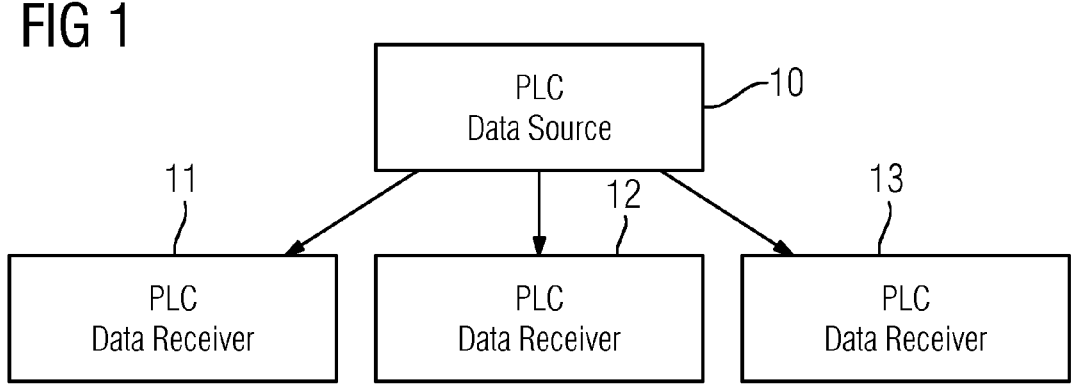
FIG. 1 shows a schematic diagram of a system for handling messages.

FIG. 1 shows a system for handling messages with a data source 10 and a total of three data receivers 11, 12 and 13. The data source 10 transmits a message to all three data receivers 11, 12 and 13. The transmitted message is only to be processed by one of the data receivers 11, 12 or 13. When processing has been carried out by one of the data receivers 11, 12 or 13, the message loses its validity for the other data receivers; the message is then obsolete for the other data receivers.

It is proposed according to the invention that when a message forwarded from the data source 10 is acknowledged by one of the data receivers 11 or 12 or 13, said acknowledged message is withdrawn for the other data receivers 12 and 13 or 11 and 13 or 11 and 12. The withdrawal of a message is dealt with by the data source 10. According to the invention, the withdrawal of a message takes place in response to the processing of the message by one of the data receivers and thus by one of the addressees of the message.

Although the acknowledged message is preferably withdrawn by the data source 10, it is also possible for the data receiver acknowledging processing of the message to withdraw the acknowledged message from the other data receivers. However for security reasons withdrawal of the acknowledged message is dealt with by the data source 10.

Figure 2:
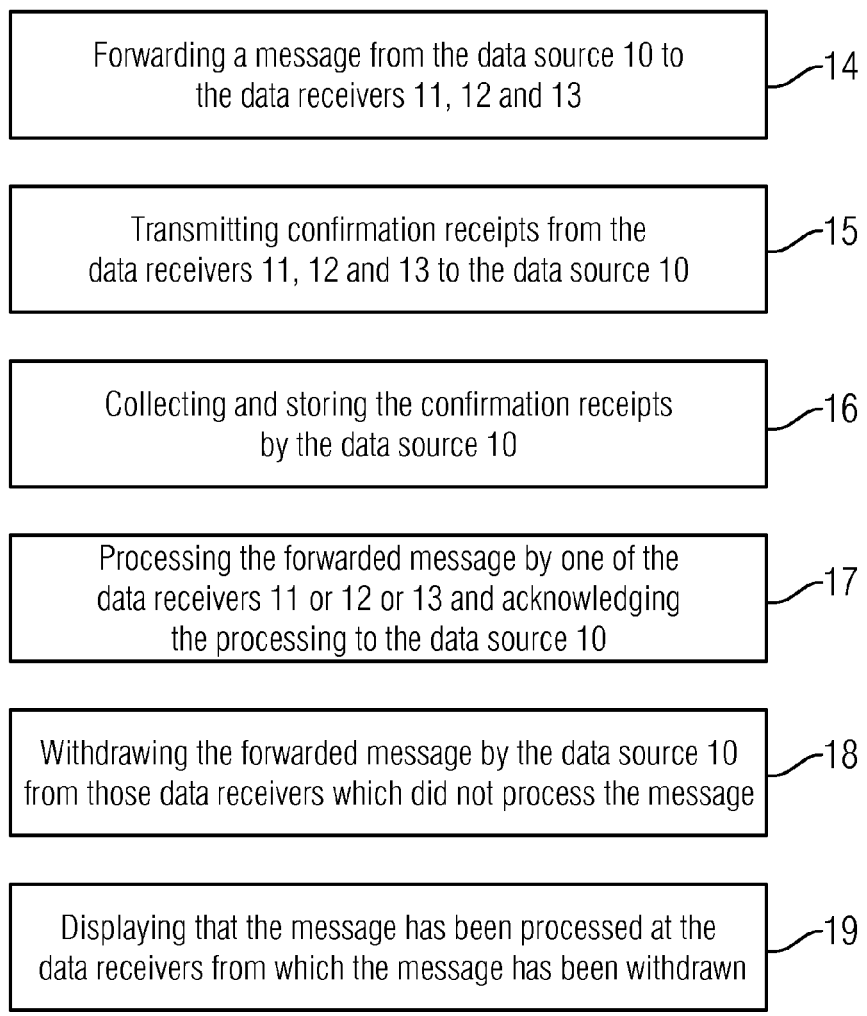
FIG. 2 shows a flow diagram to clarify the claimed method.

The claimed method is described in detail below with reference to FIG. 2. FIG. 2 therefore clarifies the different steps of the claimed method. In a first step 14 a message is transmitted from the data source 10 to the data receivers 11, 12 and 13. This message can be an error report for example. After transmission of the message from the data source 10 to the data receivers 11, 12 and 13 as set out in step 14, in a step 15 the data receivers 11, 12 and 13 transmit a receipt confirmation regarding receipt of the message automatically to the data source 10. Each receipt confirmation from each data receiver 11, 12 and 13 contains a unique ID relating to the message forwarded from the data source 10 or received by the data receiver 11, 12 or 13 and relating the respective data receiver 11, 12 or 13. This informs the data source 10 that each of the data receivers 11, 12 and 13 has duly received the forwarded message. In the next step 16 the data source 10 collects and stores the receipt confirmations. Once one of the data receivers 11, 12 or 13 has processed the message transmitted from the data source 10 and has acknowledged said processing accordingly, in step 17 the data receiver 11, 12, or 13 that has processed the message transmits an acknowledgement or processing confirmation to the data source 10. The acknowledgement or processing confirmation in turn contains a unique ID relating to the processed message and the processing station that carried out the processing operation. In response to this acknowledgement or processing confirmation, in the next step 18 the data source 10 automatically withdraws the message from the other data receivers. This is done by matching the receipt confirmations to the processing confirmation. As a result the message becomes invalid on all the other data receivers.

It is also an aspect of the present invention that in the context of step 19 not only is the message withdrawn from the other data receivers but rather that a message relating to the processing of the withdrawn message by one of the data receivers is displayed on the data receivers from which the message has been withdrawn.

It should be noted here that the claimed method can also be implemented in a simplified form, without receipt confirmations being transmitted from the data receivers to the data source. This is not essential for the withdrawal of an acknowledged message, if the data source stores and therefore knows the data receivers, to which the message was transmitted.

With the aid of the claimed method it is possible to withdraw a message specifically from all the data receivers, as soon as one of the data receivers has acknowledged processing the message. This prevents problems with obsolete messages. The claimed method is simple and effective.

The data source 10 can for example be an automation device, for example a programmable logic controller (PLC). If the programmable logic controller requires an action from a higher-order automation device, for example a process control master computer, for example because of a fault, the programmable logic controller serving as the data source transmits a corresponding message, for example an error report, to all the higher-order process control master computers, to which the programmable logic controller is connected. Receipt of the error report is confirmed by the process control master computers, by transmitting a receipt confirmation to the programmable logic controller. The first process control master computer to have adequate free capacity processes the error report and after processing the error report acknowledges processing thereof by transmitting a processing confirmation to the programmable logic controller. By matching the processing confirmation to the receipt confirmations relating to the same error report, the programmable logic controller identifies the data receivers, namely the process control master computers, on which the error report is still displayed, even though it has already been processed and is therefore obsolete. According to the invention, the programmable logic controller then withdraws this error report from the identified process control master computers.

The data source 10 can also be configured as a production unit, which, due to an unforeseeable error, transmits a message in the form of a corresponding error message to data receivers configured as processing stations. The operator who notices the error message first at their processing station and eliminates the problem behind the error message, acknowledges processing the error message and a corresponding processing confirmation is transmitted from said operator's processing station to the production unit. As a result of this confirmation, the error message is then automatically withdrawn from the other processing stations with the optional report that the error message has already been processed by the operator's processing station. This ensures that the error report is only processed by one operator and the other operators therefore do not process the obsolete error report again.

A further field of application of the present invention is the simultaneous provision of a graphic interface on a number of data receivers. This graphic interface can for example be a so-called GUI (Graphical User Interface) window with an input prompt, which is set up simultaneously on a number of client computers. As soon as the input prompt in the GUI window is complied with at one client computer, as a result of a corresponding processing confirmation the hitherto inactive GUI windows on the other client computers are closed and work only continues with the client computer that responded first to the input prompt. This also ensures that a message is only processed by one data receiver, in this instance a client computer.

Means for storing and managing the receipt confirmations and means for automatically withdrawing a message are integrated in the data source to implement the claimed method. The means for withdrawing a message match the receipt confirmations to the processing confirmation. As already mentioned above, the receipt confirmations indicate which data receiver has received which message. The processing confirmation indicates which of the data receivers, which received a message, has processed and acknowledged the processing of said message. Both the receipt confirmation and the processing confirmation provide a unique ID for the message and the data receivers. The data receivers contain means to confirm receipt of a message and also to acknowledge processing of the message.

The invention can be used particularly advantageously in conjunction with automation systems.

It should be noted that communication between the data source and the data receivers can be effected in any manner. The messages can thus be exchanged between the data source and the data receivers for example via the internet or another communication channel or communication platform. It should simply be ensured that the data source and data receivers use compatible data protocols for communication purposes.

The invention claimed is:

1. A method for handling messages in an automation system comprising programmable logic controllers (PLCs), the method comprising:
 connecting a plurality of PLC automation devices to form the automation system, wherein at least one of the PLC automation devices of the automation system serves as a data source, and wherein at least some of the PLC automation devices of the automation system serve as a plurality of data receivers;
 forwarding a message from the data source to the plurality of data receivers, wherein the message from the data source contains information representing an error report or a warning message of the automation system, the message to be processed by at least one of the automation devices serving as the plurality of data receivers, wherein, when the message containing the information representing the error report or warning message of the automation system is processed by said at least one of the plurality of data receivers, said information is no longer valid with respect to the automation devices serving as the plurality of data receivers other than said at least one data receiver;

acknowledging the forwarded message by the at least one data receiver of the plurality of data receivers, wherein the acknowledging of the forwarded message by the at least one data receiver comprises an active confirmation by the at least one data receiver indicative of performing a processing of the message containing the information representing the error report or warning message of the automation system forwarded by the data source;

withdrawing the forwarded message from the automation devices serving as the plurality of data receivers other than the at least one data receiver upon said acknowledging of the processing of the forwarded message by the at least one data receiver, wherein the withdrawing of the forwarded message from the automation devices serving as the plurality of data receivers other than the at least one data receiver is performed automatically by the automation device serving as the data source; and displaying a message on the respective automation devices serving as data receivers from which the forwarded message was withdrawn, the displayed message indicative that the forwarded message was previously processed by the at least one data receiver.

2. The method according to claim 1, wherein each data receiver confirms receipt of the forwarded message by transmitting a receipt confirmation message to the data source.

3. The method according to claim 2, wherein the receipt confirmation message includes a message ID for unambiguously identifying the forwarded message and the respective data receiver.

4. The method according to claim 2, wherein the receipt confirmation message is stored by the data source.

5. The method according to claim 1, further comprising:
processing the forwarded message by the at least one data receiver; and
acknowledging the processing of the forwarded message by transmitting a processing . confirmation message to the data source by the at least one data receiver, wherein the data source withdraws the forwarded message from the plurality of data receivers other than the at least one data receiver based on the processing confirmation message.

6. The method according to claim 5, further comprising indicating the processing of the forwarded message by the at least one data receiver to the plurality of data receivers other than the at least one data receiver.

7. A device for handling messages in an automation system comprising programmable logic controllers (PLCs), comprising:
a plurality of PLC automated devices,
wherein at least one of the PLC automated devices serves as a data source, and wherein at least some of the PLC automated devices serve as a plurality of data receivers, said at least one data source being configured to forward a message to the plurality of data receivers,
wherein the message from the data source contains information representing an error report or a warning message of the automation system, the message to be processed by at least one of the automation devices serving as the plurality of data receivers,
wherein, when the message containing the information representing the error report or warning message of the automation system is processed by said at least one of the plurality of data receivers, said information is no longer valid with respect to the automation devices serving as the plurality of data receivers other than said at least one data receiver, wherein the at least one data receiver of the plurality of data receivers acknowledges the forwarded message, wherein the acknowledgment of the forwarded message by the at least one data receiver comprises an active confirmation by the at least one data receiver indicative of performing a processing of the message containing the information representing the error report or warning message of the automation system forwarded by the data source, wherein the forwarded message is withdrawn from the automation devices serving as the plurality of data receivers other than the at least one data receiver upon acknowledging of the processing of the forwarded message by the at least one data receiver, and further wherein the automation device serving as the data source is configured to automatically withdraw the forwarded message from the automation devices serving as the plurality of data receivers other than the at least one data receiver; and a graphical user interface configured to display a message on each respective automation device serving as data receiver from which the forwarded message was withdrawn, the displayed message indicative that the forwarded message was previously processed by the at least one data receiver.

8. The device according to claim 7, wherein each data receiver confirms receipt of the forwarded message by transmitting a receipt confirmation message to the data source, the receipt confirmation message including a message ID for unambiguously identifying the forwarded message and the respective data receiver.

9. The device according to claim 7, wherein the forwarded message is processed by the at least one data receiver and the processing of the forwarded message is acknowledged by transmitting a processing confirmation message to the data source by the at least one data receiver, the data source withdrawing the forwarded message from the plurality of data receivers other than the at least one data receiver based on the processing confirmation message.

10. The device according to claim 7, wherein the processing of the forwarded message by the at least one data receiver is indicated to the plurality of data receivers other than the at least one data receiver.

11. A programmable logic controller (PLC) automation system, comprising a plurality of PLC automation devices configured to exchange messages, wherein
at least one of the PLC automation devices is configured as a data source for forwarding messages to the other automation devices, the other automation devices configured as data receivers,
a message is forwarded from the data source to the plurality of data receivers, wherein the message from the data source contains information representing an error report or a warning message of the automation system, the message to be processed by at least one of the PLC automation devices configured as the plurality of data receivers, wherein, when the message containing the information representing the error report or warning message of the automation system is processed by said at least one of the plurality of data receivers, said information is no longer valid with respect to the automation devices configured as the plurality of data receivers other than said at least one data receiver, the forwarded message is acknowledged by the at least one data receiver of the automation devices configured as the plurality of data receivers, wherein the acknowledgement of the forwarded message by the at least one data receiver comprises an active confirmation of performing a processing of the message containing the information representing the error report or warning message of the automation system forwarded by the data source, the forwarded message is withdrawn from the automation devices configured as the plurality of data receivers other than the at least one data receiver upon acknowledging of the processing of the forwarded message by the at least one data receiver, and further wherein the automation device configured as the data source is configured to automatically withdraw the forwarded message from the automation devices configured as the plurality of data receivers other than the at least one data receiver, and a message is displayed on the automation devices configured as the respective data receivers from which the forwarded message was withdrawn, the displayed message indicative that the forwarded message was previously processed by the at least one data receiver.

12. The automation system according to claim 11, wherein each data receiver confirms receipt of the forwarded message by transmitting a receipt confirmation message to the data source, the receipt confirmation message including a message ID for unambiguously identifying the forwarded message and the respective data receiver.

13. The automation system according to claim 11, wherein the forwarded message is processed by the at least one data receiver and the processing of the forwarded message is acknowledged by transmitting a processing confirmation message to the data source by the at least one data receiver, the data source withdrawing the forwarded message from the plurality of data receivers other than the at least one data receiver based on the processing confirmation message.

14. The automation system according to claim 11, wherein the processing of the forwarded message by the at least one data receiver is indicated to the plurality of data receivers other than the at least one data receiver.

* * * * *